April 30, 1963 J. A. ROSS 3,087,328
MULTIPLANE ELECTROMECHANICAL CONTROL SYSTEM
Original Filed Feb. 26, 1957 3 Sheets-Sheet 3

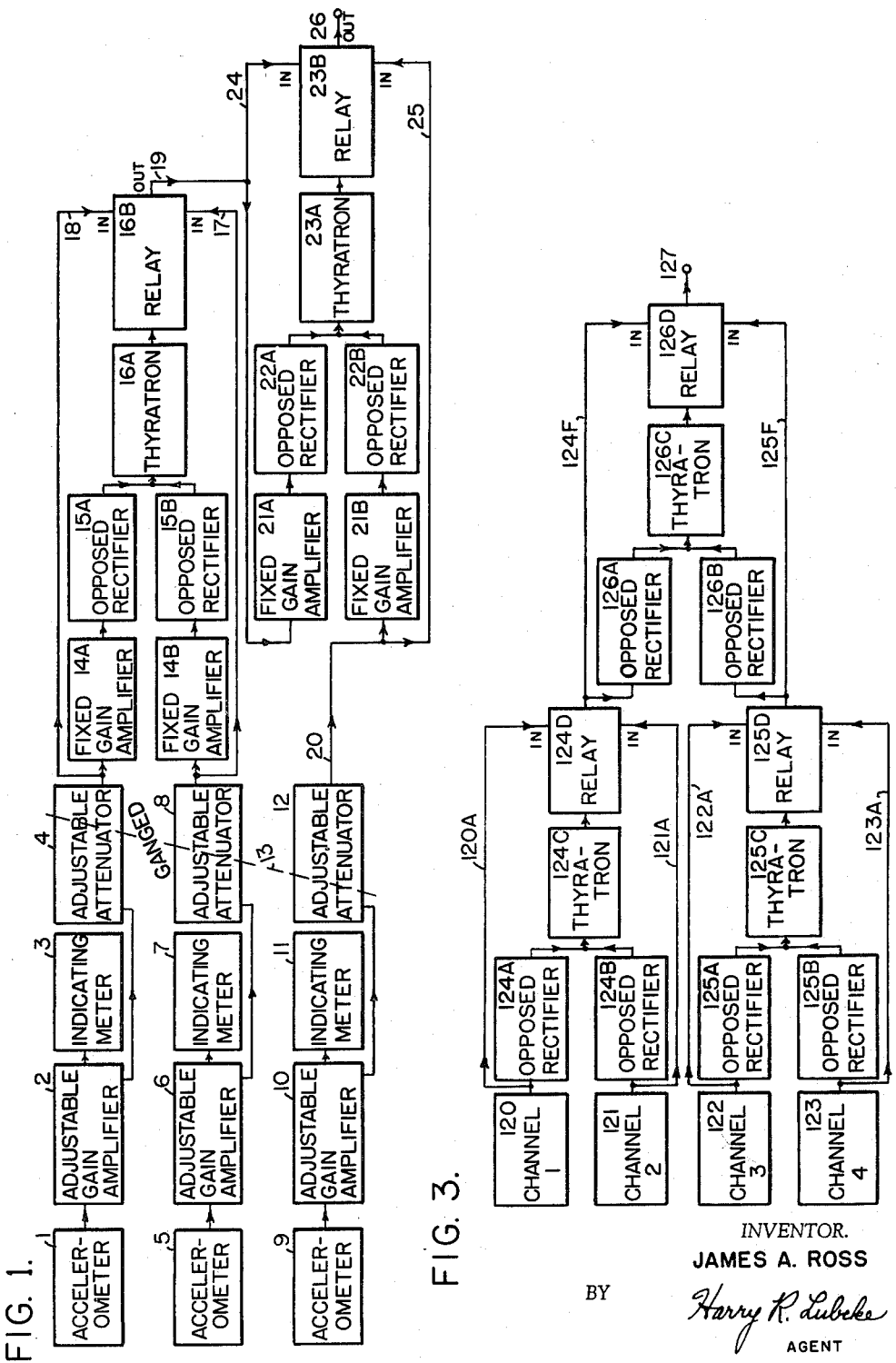
April 30, 1963  J. A. ROSS  3,087,328
MULTIPLANE ELECTROMECHANICAL CONTROL SYSTEM
Original Filed Feb. 26, 1957  3 Sheets-Sheet 1
INVENTOR.
JAMES A. ROSS
BY Harry R. Lubcke
AGENT

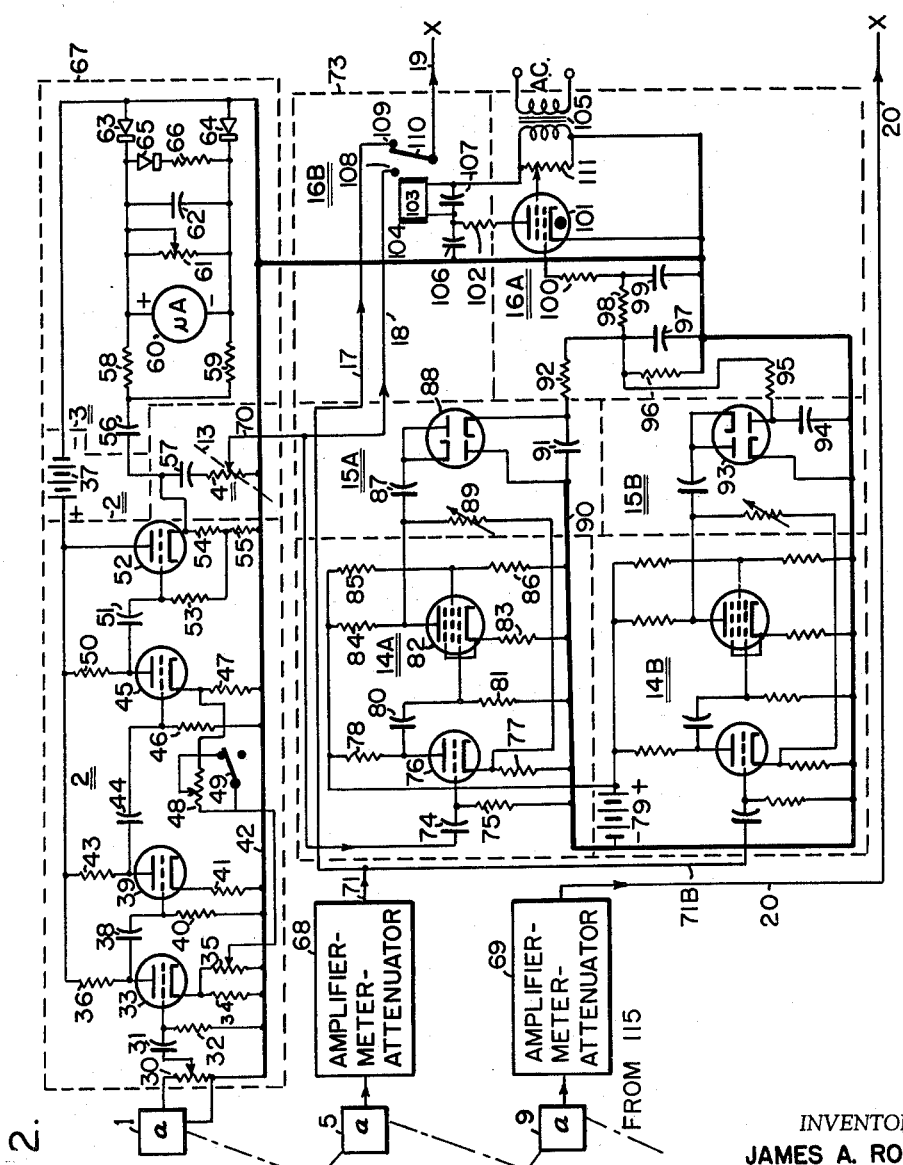

FIG. 2A.

INVENTOR.
JAMES A. ROSS
BY *Harry R. Lubcke*
AGENT

United States Patent Office 3,087,328
Patented Apr. 30, 1963

3,087,328
MULTIPLANE ELECTROMECHANICAL CONTROL SYSTEM
James A. Ross, Orange, Calif., assignor to Ling-Temco-Vought, Inc., Dallas, Tex., a corporation of Delaware
Continuation of application Ser. No. 642,602, Feb. 26, 1957. This application Feb. 19, 1962, Ser. No. 174,183
11 Claims. (Cl. 73—71.6)

My invention relates to an electrical circuit for automatically selecting the largest of at least three electrical signals, the smallest of these three signals, or a given combination of largest and smallest, and particularly to a circuit of this type for automatically selecting the largest of three acceleration-produced signals for the control of an electromechanical vibration system.

This application is a continuation of my prior application filed February 26, 1957, Serial No. 642,602, and now abandoned.

As the performance standards for electronic, airframe and missile devices are increased the precision of vibration testing thereof has also been increased. A particular test involves the vibration of a device at, but not exceeding, specified acceleration on any of three mutually perpendicular axes over a large frequency range. While it is possible for an operator to examine the response of each of three accelerometers and to manually adjust his vibration apparatus for each small increment of the frequency range, such a procedure consumes so much time and is so likely to subject the specimen to damage that the manual method is impractical even for research testing. The great advantage of an automatic control system for such testing in production work is evident.

Advanced airframe testing now demands automatic vibration control according to any of four, six or even nine parameters or of values even independent of vibration of a smaller number of parameters.

I am able to provide a multiple testing control circuit in the following manner. The three plane acceleration embodiment is used for the example.

An accelerometer (a mechanical acceleration to electrical variation transducer) is attached to the specimen in each of three reference planes desired. The electrical output of each in response to vibration is individually amplified by an amplifier preferably having adjustable gain, which may also be termed a preamplifier. With the gain adjustable, inequalities in the inherent outputs of the accelerometers may be nullified. An indicating meter is preferably provided at the output of each amplifier to indicate the magnitude of the respective accelerations. An adjustable attenuator is also connected to the output of each amplifier and all of the attenuator controls are ganged. This allows an overall gain setting of the whole system and thus determines what the acceleration of the specimen shall be. This ganged control may be calibrated directly in "g's." A further, or post-amplifier, characterized by normally having fixed gain, is connected to each attenuator. The output from each such further amplifier is connected to a rectifier, or unilaterally conducting device, and the outputs from two rectifiers are connected together in opposite electrical polarity. A low pass filter is connected to the combined output and an ionizable discharge means, or thyratron, is connected to the filter output.

If the output of the accelerometer having the positive rectifier output is greatest the thyratron (or equivalent) will conduct, closing contacts of a switching means, or relay, connected to the thyratron to connect the signal from that accelerometer channel to the output of the pair considered. If the other accelerometer output is greater and the thyratron remains non-conducting, the relay remains in the non-energized position and connects that accelerometer channel to the output.

The output signal from the above-described pair is connected to a further fixed gain amplifier and to one of a second pair of polarity-opposed rectifiers. The output signal from the fixed gain amplifier of the third channel is connected to the other of the second pair of polarity opposed rectifiers. The outputs of this second pair of rectifiers are combined in opposite polarity, filtered and used to influence a second thyratron (or equivalent) and a relay circuit selector in the same manner as was previously explained. Since all of the three signals have now been compared in a manner to select the largest, the desired result is obtained. Four, or any plurality of signals, may be similarly treated by merely adding the channel and a comparison portion of the circuit as has been outlined for each of the plurality. This may also be accomplished by comparing the channels in pairs and the resulting outputs therefrom in pairs.

The thus selected largest signal is normally used in my typical embodiment to control a variable gain amplifier inescapably according to the maximum acceleration, no matter in which plane it shall occur or how it shall shift from plane to plane as the vibration frequency changes. The variable gain amplifier is connected in the electrical chain of an electromechanical vibration system between the variable frequency oscillator and the power amplifier, thus controlling the performance of the electro-mechanical vibrator or "shaker" which vibrates the specimen.

An object of my invention is to provide a control system for automatically transferring control to that one of several indicators of a parameter which experiences a maximum value at any given time.

Another object is to provide means to automatically electrically control the mechanical testing of an object so that it is never subjected to more than a predetermined acceleration in any of a selected number of planes.

Another object is to provide control for a system that can be electrically controlled in accordance with a plurality of parameters, related or not, insofar as these parameters can be represented by variations of electrical energy.

Another object is to provide a control system for allowing a rapid vibration test of mechanical specimens at not more than a specified maximum value of acceleration in three, or more or less planes.

Another object is to provide a control system that responds to minimum values of a parameter rather than to maximum values as above stated.

Another object is to provide a control system that responds to a preselected pattern of maximum and minimum values amongst a plurality thereof.

Other objects of my invention will become apparent upon reading the following detailed specification and upon examining the accompanying drawings, in which:

FIG. 1 shows a block diagram of my control system,
FIG. 2 is a schematic circuit diagram of my invention, as is FIG. 2A,
FIG. 3 shows a block diagram of an alternate connection arrangement of my control system.

In FIG. 1, numeral 1 indicates an accelerometer, a mechanical to electrical transducer giving an electrical output proportional to the mechanical acceleration occurring along plane 1, for example. The accelerometer is attached to the specimen being vibrated, so that the acceleration along plane 1 influences it. The electrical output terminal of the accelerometer, which may include a cathode follower stage for impedance transformation, is connected to the input of adjustable gain amplifier 2, of four stages of amplification in a representative embodiment. The gain of the latter is adjustable so that the outputs of the three accelerometers normally employed may be balanced for equal outputs with equal accelerations, or for any other particular ratio between the outputs.

In determining what the several accelerations may be at any time indicating meter 3 is connected to the output of amplifier 2 to determine the magnitude thereof in plane 1. Adjustable attenuator 4 is connected to the amplifier-meter combination in a manner such that adjustment of the attenuator does not affect the meter reading.

A second accelerometer 5 is mounted and connected the same as accelerometer 1, save that it is disposed along a second plane; a plane usually at right angles to the first plane. Adjustable gain amplifier 6, indicating meter 7 and adjustable attenuator 8 are essentially serially connected to accelerometer 5 in the same way as corresponding entities were connected to accelerometer 1.

Similarly, a third accelerometer is disposed along a third, usually mutually perpendicular plane and has corresponding connected electrical entities 10, 11 and 12. Dotted line 13 indicates the ganged mechanical arrangement of attenuators 4, 8 and 12 for controlling the overall vibration level.

Dual fixed gain amplifiers 14A and 14B are two normally identical two stage amplifiers generally employed to raise the signal level sufficiently to accomplish effective rectification of the signals. One such amplifier is connected to the accelerometer channel comprised of elements 1–4, while the second such amplifier is connected to accelerometer channel 5–8; i.e., amplifiers 14A and 14B, respectively. Similarly, the 15A opposed rectifier is connected for activation to amplifier 14A and the 15B opposed rectifier to amplifier 14B, but with cathode and anode of each rectifier interchanged so that these electrodes are also interchanged at the output and the polarity of the signals appearing at the output are opposite.

As will be noted specifically in FIG. 2, the outputs of the opposed rectifiers are combined in a low pass filter to form an approximately unvarying voltage having an amplitude proportional to the mean value of the difference between the signals in the two accelerometer channels involved. This single output, shown in FIG. 1 by the junction point of the connecting wires, is connected to the input of thyratron 16A. The output of the thyratron connects to the actuating coil of relay 16B. In the non-triggered condition of the thyratron and the consequent non-energized condition of the relay coil the contacts of the relay connect wire 17 to wire 19. This corresponds to accelerometer 5 having a greater signal output than that of accelerometer 1. This condition gives a negative polarity to the output from the opposed rectifiers 15A and 15B (as will be seen in detail in FIG. 2) and the thyratron, which triggers on a positive output from the rectifiers, is therefore not rendered conducting.

When relay 16B is energized, wire 18 is connected to output wire 19 instead of wire 17. This condition corresponds to accelerometer 1 having a greater signal output than that of accelerometer 5. This condition gives a positive polarity to the output from opposed rectifiers 15A and 15B and the thyratron 16A is rendered conducting because an electrical level of positive polarity is impressed upon the grid, or control electrode, of the thyratron.

It is to noted that while the control signal actuating the thyratron is a substantially direct potential (i.e., unvarying) the circuits switched by the relay carry the amplified alternating current signals from the accelerometers. Thus, the larger one of these signals is present at the output conductor 19 to be later compared with the corresponding signal from the third accelerometer 9.

As previously disclosed the channel entities 1–4, 5–8 and 9–12 are equivalent if not identical and so the amplitude and character of the signal in conductor 19 and that in conductor 20 from the third accelerometer are strictly comparable as representing the output of the larger signal from either accelerometer 1 or 5 and the output of accelerometer 9. Thus, a second comparison of signal levels in the remaining apparatus of FIG. 1 is valid.

These signals are therefore processed through fixed gain amplifiers 21A and 21B, opposed rectifiers 22A and 22B, thyratron 23A and relay 23B in the same manner as the first two signals were processed in entities 14A, 14B; 15A, 15B; 16A and 16B, as has been explained. The signals per se are supplied through conductors 24 and 25 to the relay contacts in relay 23B. The larger of these two signals, which is now the largest of three, finally appears at output terminal 26.

It is evident that should it be desired to compare four or more signals, this can be accomplished by merely adding an additional group of entities equivalent to 9, 10, 11, 12, 21A, 21B, 22A, 22B, 23A and 23B for each additional signal; and so on without limit.

Four or more signals may also be compared by comparing through successive pairs in a manner to be later described.

The opposed rectifier comparison means per se have been treated in my U.S. Patent No. 2,935,672, granted May 3, 1960, entitled, "Displacement-Acceleration Control Circuits."

We now pass to the detailed study of my invention with the aid of the schematic circuit of FIG. 2. Certain of the elements therein are the same as in FIG. 1 and have the same identifying numerals. Numeral 1 indicates an accelerometer, as before. Two conductors conveying the electrical signal therefrom are attached to an input potentiometer 30. This provides adjustment for equalizing the outputs of the plural accelerometers and gives meaning to the term "adjustable gain amplifier" for entities 2, 6 and 10 in FIG. 1. The adjustable arm of the potentiometer is connected to a coupling capacitor 31, having a capacitance of the order of half a microfarad. Grid return resistor 32 connects to capacitor 31 and to the control grid of triode 33. Resistor 32 has a resistance of the order of one megohm, as do all the grid return resistor in FIG. 2. Connected to the cathode of tube 33 is cathode bias resistor 34 of a few thousand ohms resistance and feedback potentiometer 35 having a resistance of the order of 10,000 ohms. Potentiometer 35 also acts as a means of adjustable gain for the amplifier. Plate resistor 36 connects the plate of tube 33 to the positive terminal of plate supply battery 37 and has a resistance of the order of 100,000 ohms, as do all plate resistors in this four stage amplifier. Coupling capacitor 38 connects from the plate of triode 33 to the grid of triode 39 and has a capacitance of the order of one microfarad. Grid return resistor 40 is an exception to the previous statement, in that the resistance thereof is over two megohms. Cathode bias resistor 41 connects from the cathode of triode 39 to the common return bus 42 and this resistor has a resistance of a few thousand ohms. Triodes 33 and 39 may be of the usual receiving type 6SL7 and may be in one evacuated envelope. Plate resistor 43 connects the plate of triode 39 to battery 37.

Coupling capacitor 44 connects from the plate of triode 39 to the grid of triode 45 and has a capacitance of the order of one-tenth microfarad. The grid return resistor for triode 45 is element 46. Cathode bias resistor 47 connects to the cathode of triode 45 and there is a connection from that cathode for inverse feedback to the variable arm of resistor-potentiometer 35. An adjustable resistor 48 may be placed in or out of this feedback path by means of two position switch 49. In the upper position of the switch resistor 48 is shorted out and the gain of the amplifier is reduced according to the well known effect of inverse feedback. In the lower position of the switch the resistor 48 increases the impedance of the feedback path and thus raises the gain of the amplifier. The maximum resistance value of resistor 48 is of the order of one megohm. This is adjusted so that the rise in gain is ten times. The switch then becomes a range change switch of a factor of ten.

Plate resistor 50 connects the plate of triode 45 to the positive terminal of battery 37. Coupling capacitor 51 connects the plate of triode 45 with the grid of triode 52, for which triode the resistor 53 is the grid return resistor. Triode 52 is a cathode-follower and the return of resistor 53 is at the junction between resistors 54 and 55, in order that the bias thereon shall not be excessive. Resistor 54 has a resistance of only a few thousand ohms, while that of resistor 55 is twenty times greater. The plate of triode 52 connects directly to the positive terminal of battery 37.

The relatively low impedance output from the cathode of cathode-follower 52 passes to the indicating meter circuit via coupling capacitor 56, which has a capacitance of a few microfarads. Via another coupling capacitor 57 of twice that capacitance, the signal is passed to adjustable attenuator 4. The four stage amplifier just described is located to the left of the dotted line 2 in FIG. 2 and corresponds to the block representation in FIG. 1. Similarly, the attenuator 4 corresponds to block 4. The arm of attenuator 4 is ganged by simple mechanical means 13 to companion potentiometers 8 and 12 of FIG. 1. These electrical connections allow the signal output of triode 52 to be measured by the indicating meter as truly reflecting the output of accelerometer 1 regardless of the adjustment of potentiometer 4 for the purpose of determining the magnitude of the overall vibration parameter.

Signal energy is introduced to the meter circuit through resistors 58 and 59, each having equal resistance values of the order of 30,000 ohms. Both are connected to capacitor 56. Meter 60 is a D.C. microammeter with a full scale reading of the order of a hundred microamperes and is connected to the ends of resistors 58 and 59 opposite those connected to capacitor 56. Variable resistor 61 is connected across meter 60 and is a calibration adjustment for the same, having a maximum resistance value of a number of thousands of ohms. Adjustable resistor 48 is also a meter calibrating adjustment for the low range. For the high range the meter is calibrated by means of potentiometer 35.

Capacitor 62 is also connected across meter 60 and has a capacitance of the order of one microfarad. This capacitor prevents the meter indication from wiggling when the frequency of vibration is of the order of ten cycles, etc.

Rectifiers 63 and 64, oppositely connected between the terminals of meter 60 and the common return circuit 42, rectify the amplified accelerometer signal to provide the D.C. microampere energy for deflecting the meter. A third rectifier 65 and a series resistor 66, the latter having a resistance of a few thousand ohms, are connected across the meter terminals and increase the linearity of the meter indication as a function of signal amplitude. This meter indicating part of the circuit is shown within the dotted line 3 in FIG. 2, corresponding to block 3 in FIG. 1.

The circuit enclosed within the large dotted rectangle 67 includes entities 2, 3 and 4 of the block diagram of FIG. 1. In FIG. 2 a circuit identical to that of 67 is included within rectangles 68 and 69. The output from rectangle 67 is taken by conductor 70 from the variable arm of attenuator 4. A corresponding output is taken from rectangle 68 by conductor 71 and from rectangle 69 by conductor 20.

The output via conductor 70 becomes the input to the circuit within dotted rectangle 73. That circuit includes the entities 14A, 14B, 15A, 15B, 16A, 16B and conductors 17 and 18 of FIG. 1.

Conductor 70 connects to coupling capacitor 74 and over grid return resistor 75 to the grid of triode 76. The time constant of this RC circuit is of the order of 0.1 second, so that the low audio frequencies will not be attenuated. Unbypassed resistor 77 is connected to the cathode of triode 76. It has a resistance of a few thousand ohms and provides cathode bias for the tube. Resistor 78 connects the plate of the triode to the positive terminal of batter 79 to provide the usual plate supply voltage of a few hundred volts. Resistor 78 has a resistance of the order of 50,000 ohms, as do all plate resistors within dotted rectangle 73.

Capacitor 80 and resistor 81 compose the input circuit to the control grid of tetrode 82. This RC circuit has a time constant about half as large as the one previously described. Vacuum tubes 76 and 82 may be contained within one vacuum envelope and may be of the the 6AN8 type. An anti-oscillation resistor of several thousand ohms resistance may or may not be included in series with the control grid lead of tetrode 82, and has not been shown. Resistor 83 is again an unbypassed cathode bias resistor and the resistor 84 is the plate resistor for tube 82.

A proper voltage is provided for the screen grid of tetrode 82 by means of voltages dividers 85, 86; the former having a resistance value of the order of 50,000 ohms and the latter a value less than half that amount. The amplified accelerometer signal is taken from the plate of tetrode 82 and passed through coupling capacitor 87 to one cathode and one plate of double diode 88. Capacitor 87 has a capacitance of the order of one-quarter microfarad.

Resistor 89 is also connected to the plate of tube 82 and also to the cathode of tube 76, thereby constituting a feedback path for maintaining the gain of the amplifier constant regardless of power supply variations, ageing of tubes, etc. The resistor may be variable and have a resistance value of the order of a half-megohm.

The remaining plate of double diode 88 is connected to the common return conductor 90 and the remaining cathode is connected to the junction between capacitor 91 and resistor 92. The capacitor is part of a low pass filter, as is the resistor, but the latter also acts as an isolating impedance between this 15A side of the dual amplifier-rectifier and the opposite side 15B shown below the same in FIG. 2. Capacitor 91 has a capacitance of a fraction of a microfarad and resistor 92 a resistance of a fraction of a megohm. The cathode output of diode 88 results in a positive polarity of the rectified signal energy therefrom.

The connection of the double diode 88 will be recognized as that of the voltage doubler circuit. This gives twice the signal voltage amplitude of the ordinary diode connection and gives greater sensitivity of transfer of control from one channel to the other.

The triode-tetrode amplifier 14B below the one 14A above-described is identical thereto. The downward-extending branch of conductor 71, being 71B, connects the signal output from the second accelerometer 5 amplifier-meter-attenuator 68 to the input of the lower triode-tetrode amplifier 14B. Voltage doubler double diode rectifier 15B is connected to the amplifier 14B in the opposite way, as to plates and cathodes, as compared to the connections between amplifier 14A and rectifier 15A. This gives the opposed rectifier configuration. Thus, a plate output is taken from diode 93 and connects to the junction between capacitor 94 and resistor 95. These are also filter and isolating elements as explained above in connection with rectifier 15A.

The two rectified and partially filtered outputs from the rectifiers are joined in opposite electrical polarity across shunt-connected resistor 96 and capacitor 97. The time constant of this combination is of the order of one second, as is that of series-connected resistor 98 and shunt capacitor 99. Thyratron grid current limiting resistor 100 has a resistance value of the order of one megohm and connects the grid of thyratron, or equivalent ionized-discharge means, 101 to the output of the filter described. The filter introduces a slight lag in the variation of the signal level therethrough, thereby preventing "hunting" of the whole control circuit when one accelerometer signal takes over control from another.

Thyratron 101, or equipalent, is of small size, with a plate current rating in the hundred milliampere range. According to known thyratron behavior the tube provides an ionized discharge when the control (inner) grid becomes positive, perhaps to only a slight degree. When the control grid is negative, however, the tube will not change from the non-conducting to the conducting state. The filtered electrical energy from diodes 88 and 93 is suited to either fire or not fire the thyratron, depending upon whether the positive polarity of output from diode 88 or the negative output from diode 93 is the larger.

Resistor 102 limits the plate current of thyratron 101, the resistance value being several thousand ohms. Connected in series with the plate of the thyratron and that resistor is actuating coil 103 of relay 104. The other connection of the relay coil is connected to the secondary of transformer 105. The primary of that transformer is connected to alternating current power at terminals A.C. Capacitor 106, connected between the relay coil and signal ground, is of relatively small capacitance and is used to inhibit radio frequency discharges due to the thyratron, thus preventing interference. Capacitor 107, connected across the relay coil, is of relatively large capacitance to prevent current variations through the coil during the time the alternating current energized thyratron is between conducting cycles.

On relay 104, contact 108 connects via conductor 18 to the amplifier-meter-attenuator entity 67 and contact 109 connects via conductors 17 and 71 to second similar entity 68. If the output of accelerometer 1 is greater than that of accelerometer 5 thyratron 101 conducts and the amplified output of accelerometer 1 is connected to output conductor 19 through relay arm 110. If the output of accelerometer 5 is larger the thyratron remains non-conducting and the amplified output of accelerometer 5 is connected to conductor 19.

Potentiometer 111 is connected across the secondary of transformer 105 to allow adjustment of the screen grid potential of the thyratron to the proper value for effecting the conducting and the non-conducting states.

The amplified accelerometer signal having the greater amplitude between accelerometers 1 and 5 having now been selected, it is only necessary to compare that amplitude with the one from accelerometer 9 in order to determine which of the three is the greatest.

The signal from accelerometer 9 is passed through amplifier-meter-attenuator entity 69, which is identical to prior entities 67 and 68. This signal is therefore constituted so as to allow a valid comparison in a second dual amplifier-opposed rectifier-thyratron-relay entity 112. The latter is identical to the apparatus within the dotted rectangle 73, previously described in detail. Entity 112 is shown in FIG. 2A, with the reference numerals having primes (') in relation to those for entity 73. FIG. 2A joins FIG. 2 on conductors 19 and 20 at the "X" marks.

In FIG. 2A conductor 19 connects to coupling capacitor 74' of fixed gain amplifier 21A, this amplifier and its components being identical with the previously described fixed gain amplifier 14A of FIG. 2. Double diode rectifier 88' of opposed rectifier 22A connects to amplifier 21A through coupling capacitor 87', as before, following FIGS. 1 and 2. Similarly, conductor 20 connects to fixed gain amplifier 21B and this in turn connects to opposed rectifier 22B. The rectifiers are connected in polarity opposition through the isolating and filtering resistors and capacitors 91', 92' and 94' through 99' to thyratron 101' of the thyratron entity 23A. Likewise, relay 104' of relay entity 23B is connected to the thyratron, as before and the final output appears at terminal 26. Conductor 24 conveys the amplified accelerometer signal appearing on conductor 19 to contact 108' of relay 104', while conductor 25 conveys the amplified accelerometer signal appearing on conductor 20 to contact 109' of relay 104'.

This completes the description of the preferred embodiment of my invention. My invention is often utilized with further control apparatus, such as vibration testing equipment, as explained below.

The greatest accelerometer signal appearing at terminal 26 is conveyed to the control input of a gain-adjusting amplifier of the automatic type, such as that described in my Patent No. 2,844,777, entitled, "Vibrator Servo Amplifiers," filed November 16, 1955 and issued July 22, 1958. This servo amplifier, or "means for controlling" 114 of FIG. 2A, is connected between a source of electrical oscillations, etc. and the power amplifier of an electromechanical vibration system. It automatically controls the amplitude of the oscillation input to the power amplifier in accordance with the desired parameter, as selected by the present invention. The electrical to mechanical transducer, or shaker, of electromechanical system 115 is thus controlled. The servo loop is completed through the accelerometers "a" mentioned in this invention and shown in FIG. 2 as mechanically connected to system 115 by the dashed line.

Certain alternate embodiments of my invention are possible.

It has previously been mentioned that the amplified accelerometer signals reach each relay contact, such as contacts 108 and 109. Should it be desired to control a system from the smallest rather than from the largest signal, it is merely necessary to reverse the connections to the contacts at the relay. Then the smaller of two signals appears on conductor 19 and the smallest signal at terminal 26.

It is also possible to select the smaller signal within rectangle 73 of FIG. 2 and to compare that with the signal on conductor 20, selecting the larger of those two signals in entity 112 in FIG. 2A by leaving that entity unaltered. Numerous combinations of largest and smallest signal control are possible, particularly when more than three signals are handled according to my invention, as by a simple multiplicity of entities as has been explained.

It will be understood that my invention is equally applicable to vibration testing if the accelerometers are replaced with other means that give electrical outputs corresponding to velocity, displacement, or any other parameter of vibration. Also, one means may respond to velocity, another to acceleration, another to displacement, etc. Inequalities of inherent response of such varied means may be equalized by adjusting the variable controls that have been described, such as 30, 48, 13, 89, etc. Furthermore, any alternating signals may be compared, whether or not these originate from vibration apparatus and whether or not they are of the same alternating frequency, as long as they are in the same general band of frequencies, such as audio frequencies.

My invention has been detailed by showing means to compare three parameters, three values of one parameter, or other equivalents. I have also shown how a greater number of such functions may be compared by adding an additional channel and an additional rectifier-comparator means for each new function.

In a generally similar manner such parameters or values may be compared in pairs and the results thereof subsequently compared in pairs. This alternate arrangement is shown in FIG. 3, for a group of four.

The channels 120, 121, 122, 123 each comprise the essential elements of prior entities 1, 2, 3 and 4 of FIG. 1. Also following the arrangement of FIG. 1, channel 120 is followed by opposed rectifier 124A and channel 121 by opposed rectifier 124B. Fixed gain amplifiers, as 14A and 14B of FIG. 1 may be interposed or not, depending upon the signal level required for effective rectification, as has been explained previously. In any event, the opposed rectifiers are joined in polarity opposition, as before, and the signal as rectified and filtered at the juncture is applied to control thyratron 124C. The latter is employed to control relay 124D, as before. The signals per se are conveyed to the relay contacts via conductors 120A and 121A, which enter the relay entity 124D.

The second pair of channels 122 and 123 are similarly compared. Opposed rectifier 125A is connected to channel 122 and opposed rectifier 125B is connected to channel 123. These rectifiers are connected in opposite polarity and to thyratron 125C. The latter is connected to relay 125D. The signal from channel 122 is conducted to relay 125D by conductor 122A and the signal from channel 123 is conducted to relay 125D by conductor 123A.

Carrying out the comparison by pairs, the output signal from relay 124D enters opposed rectifier 126A and the output signal from relay 125D enters opposed rectifier 126B. These rectifiers are connected in opposite polarity and to thyratron 126C. The latter is connected to actuate relay 126D. The signal from the selected output of relay 124D is conducted to relay 126D by conductor 124F and the signal from the selected output of relay 125D is conducted to relay 126D by conductor 125F. The final and fully compared output thus appears at terminal 127. This would normally be the greatest of the four signal magnitudes originating in one of the channels 120, 121, 122, 123, but may, instead, be the smallest signal, or a combination of greatest and smallest, as has been explained.

Considering details of the equipment battery 37 may be replaced by the usual unregulated A.C. to D.C. power supply. Battery 79 may be similarly replaced, but a regulated power supply is preferred. Heaters of the vacuum tubes and the supply therefor have been omitted from the schematic diagram according to custom, since these are conventional.

Although not shown for sake of clarity, particularly the long conductors that carry signal energy may be shielded by employing the known coaxial type conductor. The outer shields thereof are connected to the common return conductors 42, 90. These conductors are the "ground" for the apparatus and may be connected directly to a ground, or to the same through a capacitor of low reactance, etc., depending upon whether a direct potential is also to be impressed upon conductors 42, 90 for other purposes within the whole system which are not concerned with this invention.

The tube types used in the amplifiers are not critical, even a pentode may be employed in place of a triode, and so on. The feedback circuits tend to give required constancy of performance regardless of tube characteristics or power supply variations.

While testing functions have perhaps been exclusively inferred in the application of my invention, it will be appreciated that the multiple selective functioning may be employed in industrial control systems, to alter control between flight parameters in airplane or missile vehicles and in numerous similar circumstances. Certain operations may be controlled directly by the conduction or non-conduction states of the thyratrons alone, in which situations the relays 104, etc. are not required.

Other substitutions are permissible, such as any form of unilateral conductor for any of the rectifiers utilized. Fewer or greater number of stages of amplification may be employed. The indicating instruments and the attenuators may be omitted for simplification, in which case the pre- and the post-amplifiers become one amplifier. While negative feedback in the amplifiers is desirable in practical apparatus, this also may be omitted. Similarly, electronic circuit selection means, or other switching means, may be employed instead of the relay shown.

In speaking of the "number" concerning items of apparatus, this does not indicate a plurality thereof, but in each instance the identifying numeral for the channel, as channel 1, channel 2, etc. in FIG. 3.

Various other modifications in the characteristics of the circuit elements, details of circuit connections and alteration of the coactive relation between elements may be taken without departing from the scope of my invention.

Having thus fully described my invention and the manner in which it is to be practiced, I claim:

1. A system for comparing the magnitudes of three electrical signals of related frequency comprising:
   (a) first, second and third electrical signal sources;
   (b) first, second and third amplifiers, each said signal source being connected to the input of the corresponding numbered said amplifier;
   (c) first, second and third rectifier means, the input of each said rectifier means connected to the output of the correspondingly numbered amplifier;
   (d) the outputs of said first and second rectifier means connected together in opposite polarity;
   (e) a first ionized-discharge means, the output of said first and second connected rectifier means connected to said first ionized-discharge means to cause the same to conduct when the electrical output from the said connected first and second rectifier means is of one polarity;
   (f) first switching means, said first switching means having an output and having first and second inputs connected respectively to the outputs of said first and second amplifiers, said first switching means also connected to said first ionized-discharge means for activation when said first ionized-discharge means conducts; thereby to connect the input of said first switching means corresponding to the number of the said rectifier means having an output of said one polarity to the output of said first switching means, and when said first ionized-discharge means does not conduct to connect the input of said first switching means corresponding to the number of said rectifier means having an output of opposite polarity to the output of said first switching means;
   (g) a fourth amplifier having its input connected to said output of said first switching means;
   (h) a fourth rectifier means having its input connected to the output of said fourth amplifier and its output connected in opposite polarity to the output of said third rectifier means;
   (i) a second ionized-discharge means, the output of said connected third and fourth rectifier means connected to said second ionized-discharge means to cause the same to conduct when the electrical output from said third and fourth rectifier means is of said one polarity;
   (j) second switching means, said second switching means having an output and having first and second inputs connected respectively to the outputs of said first switching means and said third amplifier, said second switching means connected to said second ionized-discharge means for actuation when said second ionized-discharge means conducts, thereby to connect the input of said second switching means corresponding to the number of the said rectifier means having an output of said one polarity to the output of said second switching means, and when said second ionized-discharge means does not conduct to connect the other of said inputs of said second switching means to the output of said second switching means;
   (k) whereby there appears at said output of said second switching means an amplified signal corresponding to the largest signal from amongst said first, second and third electrical signal sources.

2. The system of claim 1 in which said electrical signals are proportional to different parameters of vibration;
   (a) said first signal source constituted to provide an electrical signal proportional to acceleration;
   (b) said second signal source constituted to provide an electrical signal proportional to velocity; and (c) said third signal source constituted to provide an electrical signal proportional to displacement.

3. A system for comparing the magnitudes of three electrical signals of related frequency comprising:

(a) first, second and third electrical signal sources;
(b) first, second and third amplifiers, each said signal source being connected to the input of the corresponding numbered said amplifier;
(c) first, second and third rectifier means, the input of each said rectifier means connected to the output of the correspondingly numbered amplifier;
(d) the outputs of said first and second rectifier means connected together in opposite polarity;
(e) a first thyratron, the output of said first and second connected rectifier means connected to said first thyratron to cause the same to conduct when the electrical output from said connected first and second rectifier means is of positive polarity;
(f) first switching means, said first switching means having an output and having first and second inputs connected respectively to the outputs of said first and second amplifiers, said first switching means also connected to said first thyratron for activation when said first thyratron conducts; thereby to connect the input of said first switching means corresponding to the number of the said rectifier means having an output of negative polarity to the output of said first switching means, and when said first thyratron does not conduct to connect the input of said first switching means corresponding to the number of said rectifier means having an output of positive polarity to the output of said first switching means;
(g) a fourth amplifier having its input connected to said output of said first switching means;
(h) a fourth rectifier means having its input connected to the output of said fourth amplifier and its output connected in opposite polarity to the output of said third rectifier means;
(i) a second thyratron, the output of said connected third and fourth rectifier means connected to said second thyratron to cause the same to conduct when the electrical output from said third and fourth rectifier means is of positive polarity;
(j) second switching means, said second switching means having an output and having first and second inputs connected respectively to the outputs of said first switching means and said third amplifier, said second switching means connected to said second thyratron for actuation when said second thyratron conducts, thereby to connect the input of said second switching means corresponding to the number of the said rectifier means having an output of negative polarity to the output of said second switching means and when said second thyratron does not conduct to connect the other of said inputs of said second switching means to the output of said second switching means;
(k) whereby there appears at said output of said second switching means an amplified signal corresponding to the smallest signal from amongst said first, second and third electrical signal sources.

4. A system for comparing the magnitudes of three electrical signals of related frequency comprising:

(a) first, second and third electrical signal sources;
(b) first, second and third amplifiers, each said signal source being connected to the input of the corresponding numbered said amplifier;
(c) first, second and third rectifier means, the input of each said rectifier means connected to the output of the correspondingly numbered amplifier;
(d) the outputs of said first and second rectifier means connected together in opposite polarity;
(e) a first thyratron, the output of said first and second connected rectifier means connected to said first thyratron to cause the same to conduct when the electrical output from said connected first and second rectifier means is of positive polarity;
(f) first switching means, said first switching means having an output and having first and second inputs connected respectively to the outputs of said first and second amplifiers, said first switching means also connected to said first thyratron for actuation when said first thyratron conducts; thereby to connect the input of said first switching means corresponding to the number of the said rectifier means having an output of negative polarity to the output of said first switching means, and when said first thyratron does not conduct to connect the input of said first switching means corresponding to the number of said rectifier means having an output of positive polarity to the output of said first switching means;
(g) a fourth amplifier having its input connected to said output of said first switching means;
(h) a fourth rectifier means having its input connected to the output of said fourth amplifier and its output connected in opposite polarity to the output of said third rectifier means;
(i) a second thyratron, the output of said connected third and fourth rectifier means connected to said second thyratron to cause the same to conduct when the electrical output from said third and fourth rectifier means is of positive polarity;
(j) second switching means, said second switching means having an output and having first and second inputs connected respectively to the outputs of said first switching means and said third amplifier, said second switching means connected to said second thyratron for actuation when said second thyratron conducts, thereby to connect the input of said second switching means corresponding to the number of the said rectifier means having an output of positive polarity to the output of said second switching means, and when said second thyratron does not conduct to connect the other of said inputs of said second switching means to the output of said second switching means;
(k) whereby there appears at said output of said second switching means an amplified signal corresponding to the smaller between said first and second electrical signal sources and corresponding to the larger between that signal and the signal from said third electrical signal source.

5. The system of claim 4 in which the connections of said amplifiers recited in both paragraphs (f) and (j) are reversed with respect to the polarity of the said rectifier means so that the maximum signal between said first and second electrical signal sources is compared with the minimum between that signal amplitude and that of said third electrical signal source.

6. A system for comparing the magnitudes of three electrical signals of related frequency comprising:

(a) first, second and third electrical signal sources;
(b) first, second and third preamplifiers, each said signal source being connected to the input of the correspondingly numbered said amplifier;
(c) first, second and third attenuators, having means for simultaneous adjustment, the input of each said attenuator being connected to the output of the correspondingly numbered said preamplifier;
(d) first, second and third post-amplifiers, the input of each said post-amplifier connected to the output of the correspondingly numbered said attenuator;
(e) first, second and third rectifier means, the input of each said rectifier means connected to the output of the correspondingly numbered post-amplifier;
(f) the outputs of said first and second rectifier means connected together in opposite polarity;
(g) a first thyratron, the output of said first and second connected rectifier means connected to said first thyratron to cause the same to conduct when the electrical output from said connected first and second rectifier means is of positive polarity;

(h) first switching means, said first switching means having an output and having first and second inputs connected respectively to the outputs of said first and second attenuators, said first switching means also connected to said first thyratron for activation when said first thyratron conducts; thereby to connect the input of said first switching means corresponding to the number of the said rectifier means having an output of positive polarity to the output of said first switching means, and when said first thyratron does not conduct to connect the input of said first switching means corresponding to the number of said rectifier means having an output of negative polarity to the output of said first switching means;

(i) a fourth post-amplifier having its input connected to said output of said first switching means;

(j) a fourth rectifier means having its input connected to the output of said fourth post-amplifier and its output connected in opposite polarity to the output of said third rectifier means;

(k) a second thyratron, the output of said connected third and fourth rectifier means connected to said second thyratron to cause the same to conduct when the electrical output from said third and fourth rectifier means is of positive polarity;

(l) a second switching means, said second switching means having an output and having first and second inputs connected respectively to the outputs of said first switching means and said third attenuator, said second switching means connected to said second thyratron for actuation when said second thyratron conducts, thereby to connect the input of said second switching means corresponding to the number of the said rectifier means having a positive output to the output of said second switching means, and when said second thyratron does not conduct to connect the other of said inputs of said second switching means to the output of said second switching means;

(m) whereby there appears at said output of said second switching means an amplified signal corresponding to the largest signal from amongst said first, second and third electrical signal sources.

7. A system for comparing the magnitudes of three electrical signals of related frequency comprising:

(a) first, second and third electrical signal sources, (b) first, second and third adjustable gain amplifiers, each said signal source being connected to the input of the correspondingly numbered said amplifier;

(c) first, second and third indicating meters, each said meter connected to the correspondingly numbered said adjustable gain amplifier so as to indicate the amplitude of the signal flowing therein;

(d) first, second and third adjustable attenuators, all said attenuators being ganged mechanically for simultaneous adjustment, the input of each said attenuator being connected to the output of the correspondingly numbered said adjustable gain amplifier;

(e) first, second and third fixed gain amplifiers, the input of each said fixed gain amplifier connected to the output of the correspondingly numbered said adjustable attenuator;

(f) first, second and third voltage-doubler rectifiers, the input of each said rectifier connected to the output of the correspondingly numbered said fixed gain amplifier;

(g) the outputs of said first and second rectifiers connected together in opposite electrical polarity;

(h) a first low pass filter, the input of said first low pass filter connected to said connected together first and second rectifiers;

(i) a first thyratron, the output of said first low pass filter connected to said first thyratron to cause the same to conduct when the electrical output from said low pass filter has a positive polarity;

(j) a first relay, said first relay having an output and having first and second inputs connected respectively to the outputs of said first and second adjustable attenuators, said first relay also connected to said first thyratron for actuation when said first thyratron conducts; thereby to connect the input of said first relay corresponding to the number of the said rectifier having an output of positive polarity to the output of said first relay, and when said first thyratron does not conduct to connect the input of said first relay corresponding to the number of said rectifier having an output of negative polarity to the output of said first relay;

(k) a fourth fixed gain amplifier having its input connected to said output of said first relay;

(l) a fourth voltage-doubler rectifier having its input connected to the output of said fourth fixed gain amplifier and its output connected together in opposite polarity to the output of said third rectifier;

(m) a second low pass filter, the input of said second low pass filter connected to said connected-together third and fourth rectifiers;

(n) a second thyratron, the output of said second low pass filter connected to said second thyratron to cause the same to conduct when the electrical ouput from said second low pass filter has a positive polarity;

(o) a second relay, said second relay having an output and having first and second inputs connected respectively to the outputs of said first relay and said third adjustable attenuator, said second relay connected to said second thyratron for actuation when said second thyratron conducts, thereby to connect the input of said second relay corresponding to the number of the said rectifier having an output of positive polarity to the output of said second relay, and when said second thyratron does not conduct to connect the other of said inputs of said second relay to the ouput of said second relay;

(p) whereby there appears at said output of said second relay an amplifier signal corresponding to the largest signal from amongst said first, second and third electrical signal sources.

8. A system for comparing the magnitudes of four electrical signals of related frequency comprising:

(a) first, second, third and fourth electrical signal sources;

(b) first, second, third and fourth amplifiers, the input of each said amplifier connected to said correspondingly numbered signal source;

(c) first, second, third and fourth rectifier means connected to the output of said correspondingly numbered amplifier;

(d) the outputs of said first and second rectifier means connected together in opposite polarity at a first junction point, and the outputs of said third and fourth rectifier means connected together in opposite polarity at a second junction point;

(e) first and second ionizable discharge means, connected for control to said first and said second junction points, respectively, each said ionizable discharge means triggered to conduction upon the appearance of electrical energy of positive polarity at its associated junction point;

(f) first switching means, said first switching means having first and second inputs connected respectively to the outputs of said first and second amplifiers, and having an output, said first switching means also connected for actuation by said first ionizable discharge means when the same is triggered to conduction; thereby to connect the input of said first switching means corresponding to the number of said rectifier means having an output of positive polarity to the output of said first switching means; and when said first ionizable discharge means is not triggered to conduction to connect the input of said first switching means corresponding to the number of said rectifier means having an output of negative polarity to the output of said first switching means;

(g) second switching means, said second switching means having first and second inputs connected respectively to the outputs of said third and fourth amplifiers, and having an output, said second switching means also connected for actuation by said second ionizable means when the same is triggered to conduction; thereby to connect the input of said second switching means corresponding to the number of said rectifier means having an output of positive polarity to the output of said second switching means; and when said second ionizable discharge means is not triggered to conduction to connect the input of said second switching means corresponding to the number of said rectifier means having an output of negative polarity to the output of said second switching means;

(h) fifth and sixth rectifier means, having their inputs connected respectively to said outputs of said first and second switching means, and their outputs connected together in opposite polarity at a third junction point;

(i) third ionizable discharge means, connected for control to said third junction point, said ionizable discharge means thus triggered to conduction upon the appearance of electrical energy of positive polarity at said third junction point;

(j) third switching means, said third switching means having first and second inputs connected respectively to said outputs of said first and second switching means, and having an output, said third switching means also connected for actuation by said third ionizable discharge means when the same is triggered to conduction; thereby to connect the input of said third switching means corresponding to the number between the two said fifth and sixth rectifier means having an output of positive polarity to the output of said third switching means; and when said third ionizable discharge means is not triggered to conduction to connect the input of said third switching means to that of said fifth and sixth rectifier means having an output of negative polarity to the output of said third switching means;

(k) whereby there appears at said output of said third switching means a signal corresponding to the largest of said first, second, third and fourth said electrical signals.

9. The system of claim 8 in which the connections of said amplifiers in paragraphs (f) and (g) and of said first and second switching means in paragraph (j) are reversed with respect to the polarity of the said rectifiers so that the minimum signal is in each instance connected to the respective outputs of said first, second and third said switching means and the minimum signal of said four electrical signal sources appears at the output of said third switching means.

10. The system of claim 8 in which the connections of said first and second amplifiers recited in paragraph (f) are reversed with respect to the polarity of said first and second rectifier means so that the minimum signal flowing in either of said first and second amplifiers is subsequently compared with the maximum signal from said third and fourth amplifiers and the greater signal thereof appears at the output of said third switching means.

11. In an electromechanical vibration system, means for limiting the acceleration due to said vibration to a predetermined value on any of three mutually perpendicular axes comprising:

(a) first, second and third accelerometers, corresponding to the three axes, each of said accelerometer adapted to produce an electrical output proportioned to the acceleration on its corresponding axis;

(b) first, second and third adjustable gain, feedback-stabilized amplifiers, the output of each said accelerometer being connected to the input of said adjustable gain, feedback-stabilized amplifier which is correspondingly numbered;

(c) first, second and third indicating meters, each said meter connected to said adjustable gain, feedback-stabilized amplifier which is correspondingly numbered so as to indicate the amplitude of the acceleration signal flowing therein, each said meter having connected to it a circuit to prevent variation of indication at low vibration frequencies;

(d) first, second and third variable attenuators, all said attenuators being ganged, the input of each said attenuator being connected to the output of said adjustable gain, feedback-stabilized amplifier which is correspondingly numbered;

(e) first, second and third fixed gain, feedback-stabilized amplifiers, the input of each said fixed gain amplifier connected to the output of said variable attenuator which is correspondingly numbered;

(f) first, second and third rectifiers, the input of each said rectifier connected to the output of said fixed gain, feedback-stabilized amplifier which is correspondingly numbered;

(g) the outputs of said first and second rectifiers connected together in opposite polarity and connected to the input of a first low pass filter;

(h) the output of said first low pass filter connected to a first thyratron, said first thyratron connected so as to conduct when the signal at the connected together outputs of said first and second rectifiers is positive;

(i) a first relay, said first relay having an output and having first and second inputs connected respectively to the outputs of said first and second variable attenuators, said relay actuated by said first thyratron so that when said first thyratron conducts, there is connected to said output of said first relay the input of said first relay whose number corresponds to the number of said rectifier having a positive output, and when said first thyratron is not conducting, the other of said inputs of said first relay is connected to the output of said first relay;

(j) a fourth fixed gain, feedback-stabilized amplifier having its input connected to said output of said first relay;

(k) a fourth rectifier, having its input connected to the output of said fourth fixed gain, feedback-stabilized amplifier, and being connected together at its output in opposite polarity with the output of said third rectifier;

(l) a second low pass filter, having its input connected to the connected together outputs of said third and fourth rectifiers;

(m) a second thyratron, the output of said second low pass filter connected to said second thyratron so that said second thyratron will conduct when the signal at the connected together outputs of said third and fourth rectifiers is positive;

(n) a second relay, said second relay having an output and having first and second inputs connected respectively to the outputs of said first relay and said third variable attenuator, said second relay actuated by said second thyratron so that when said second thyratron is conducting, there is connected to said output of said second relay the input of said second relay which is connected to the element through which passed the signal which became the thyratron-triggering positive polarity signal at the connected together outputs of said third and fourth rectifiers, and when said second thyratron is not conducting, the other of said inputs of said second relay is connected to said output of said second relay, whereby there appears at said output of said second relay an amplified signal corresponding to the output of said accelerometer which has the largest output signal;

(o) means for controlling the operation of the electro-mechanical vibration system, said means connected to said output of said second relay and operating as a function of the signal appearing at said output.

References Cited in the file of this patent

UNITED STATES PATENTS

| | | |
|---|---|---|
| 2,594,087 | Soffel | Apr. 22, 1952 |
| 2,873,312 | Moe | Feb. 10, 1959 |

FOREIGN PATENTS

| | | |
|---|---|---|
| 880,001 | Germany | July 16, 1953 |